C. G. EATON.
AUTOMOBILE BED.
APPLICATION FILED MAY 23, 1921.

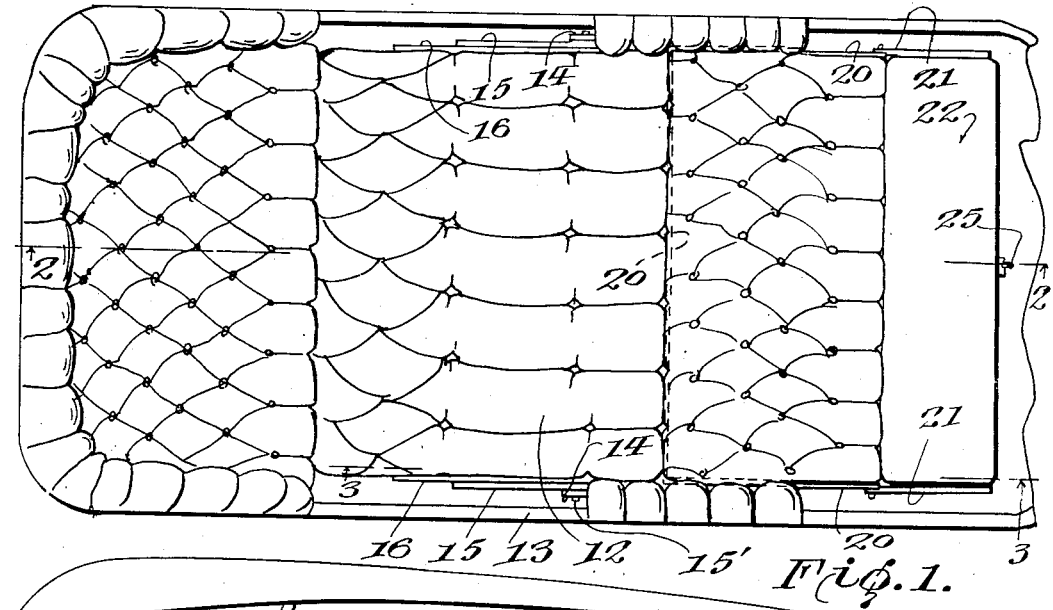
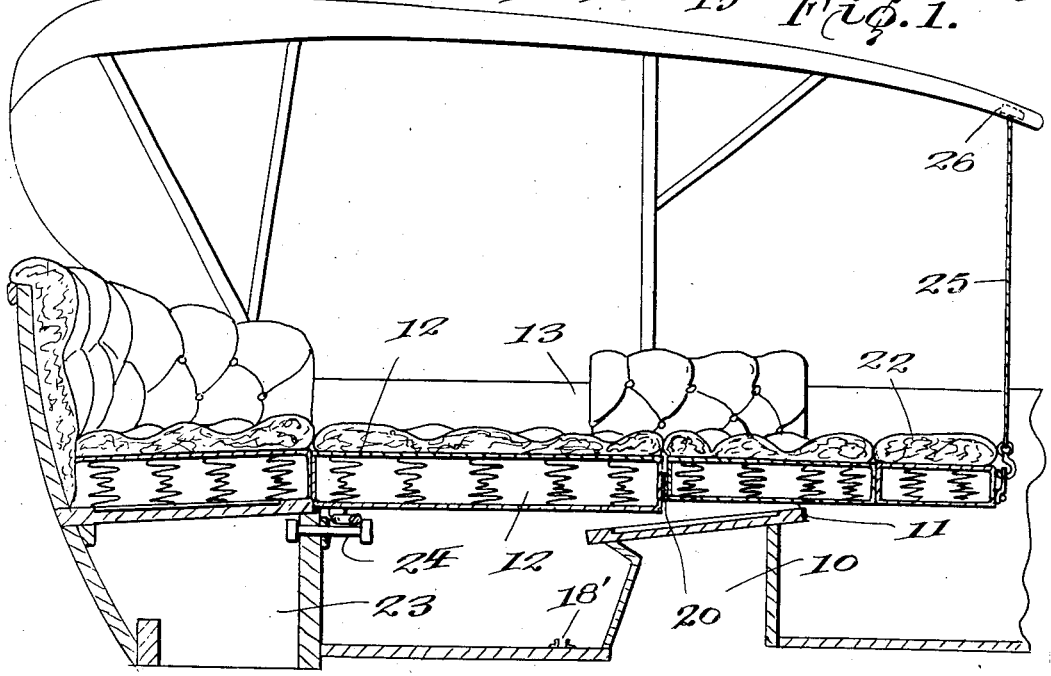

1,409,687.

Patented Mar. 14, 1922.
2 SHEETS—SHEET 2.

Inventor:
Claude G. Eaton.

Attorneys.

UNITED STATES PATENT OFFICE.

CLAUDE G. EATON, OF FLINT, MICHIGAN.

AUTOMOBILE BED.

1,409,687. Specification of Letters Patent. Patented Mar. 14, 1922.

Application filed May 23, 1921. Serial No. 471,689.

*To all whom it may concern:*

Be it known that I, CLAUDE G. EATON, a citizen of the United States, residing at Flint, in the county of Genesee, State of Michigan, have invented certain new and useful Improvements in Automobile Beds; and I do hereby declare the following to be a full, clear, and exact description of the invention, such as will enable others skilled in the art to which it appertains to make and use the same.

This invention relates to new and useful improvements in beds and particularly to beds for use in automobiles.

One object of the invention is to so construct and arrange the seats of an automobile that they may be easily and quickly manipulated to form a bed for the occupants of the automobile.

Another object is to provide an automobile seat construction such that when not used as a bed, the seats will have the appearance and usefulness of the ordinary automobile seats.

Other objects and advantages will be apparent from the following description when taken in connection with the accompanying drawings:

In the drawings;

Figure 1 is a top plan view of an automobile equipped with the improved bed and seat construction, the seats being converted into the form of a bed and the automobile top removed.

Figure 2 is a vertical longitudinal central view through the bed, on the line 2—2 of Figure 1, but showing the automobile top up.

Figure 4:
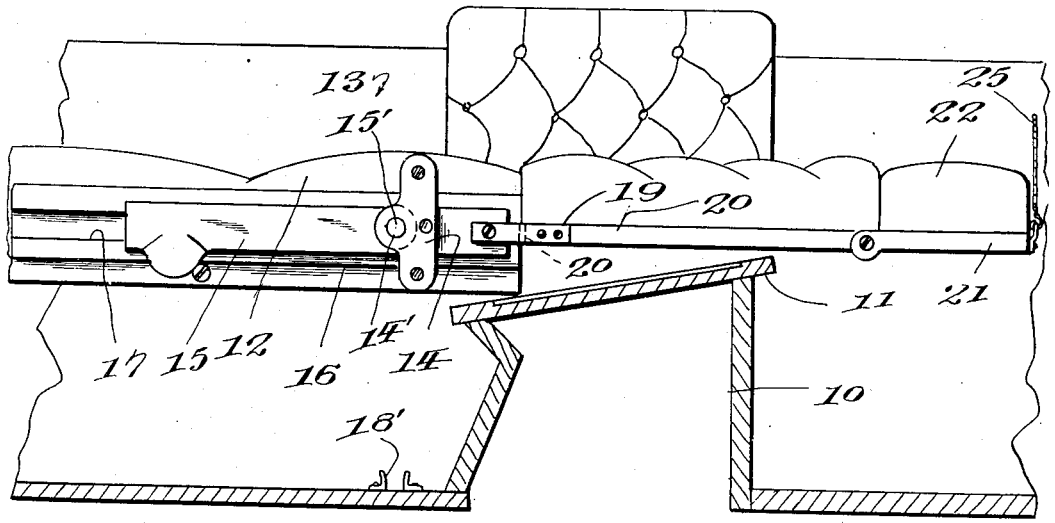
Figure 4 is a view similar to Figure 3, but showing the seats converted into a bed.
Figure 3:
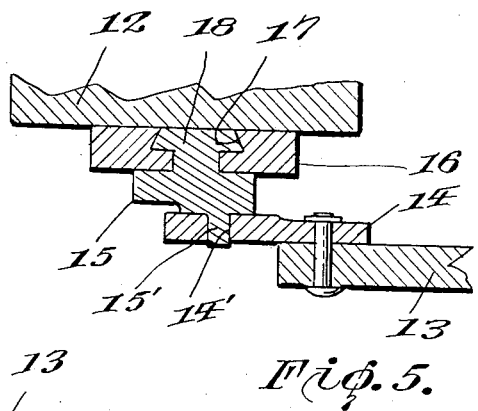
Figure 3 is a vertical longitudinal sectional view just inside of the side wall of the automobile on the line 3—3 of Figure 1 the back of the front seat of the automobile being raised.
Figure 5:
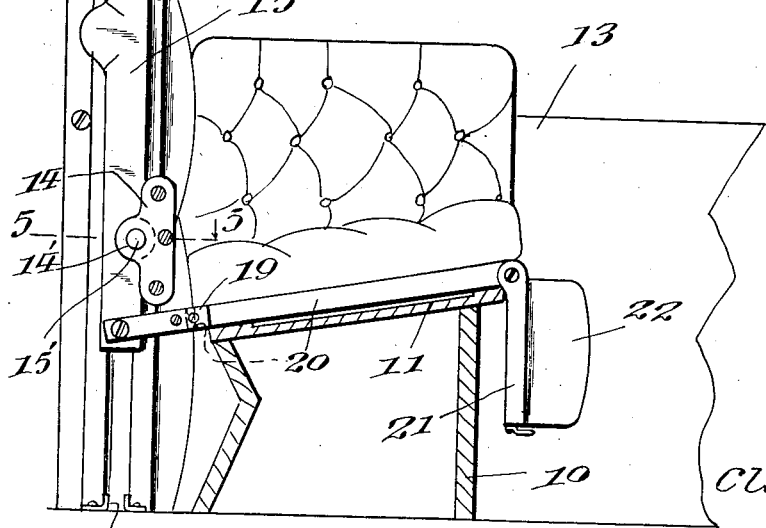
Figure 5 is an enlarged sectional detail view of one end of the back of the front seat, and the sliding connections.

Referring particularly to the accompanying drawings, 10 represents the box of the front seat of an automobile, 11 the seat cushion frame thereof, and 12 the cushion frame of the back of said front seat, while 13 represents the side walls of the automobile.

Secured to the inner face of each side wall 13 of the automobile, at points approximately at the level of the front portion of the box 10, and immediately outward of the sides of the back frame 12, are the castings 14, each having an opening 14'. Secured to the vertical side faces of the back frame 12 are the metal plates 16, each having a longitudinally extending dove-tail groove 17. A metal plate 15 has a longitudinally extending dove-tail rib 18 which is received in the dove-tail groove 17 of the plate 16. The plate 15 also has a trunnion 15' which is received in the opening 14' of the casting 14. It will be noted that the back 12 extends downwardly to the floor of the automobile, and on the floor is mounted a detent 18' which engages with the lower end portion of the ribbed plate 16 to retain the back in upright seat-back forming position. Pivotally connected to the inner or lower end of each of the grooved plates 15 is an arm 19, which extends forwardly across the top of the front box 10, and is connected to the other arm 19 by a transverse bar 20. Secured to, and disposed between the arms 19, is the cushion frame 11 of the seat of the front seat, said frame being movable with the said arms. Pivotally connected to the forward ends of the arms 19 is a frame 21, which carries the cushion 22, said frame being arranged to be folded down against the front wall of the box 10, when not in use, and to form a foot rest, when used in connection with the bed, as will be more clearly explained hereinafter.

Slidably mounted in the front wall of the box 23, of the rear seat of the automobile, are the rods 24 which are adapted to support the upper end of the back of the front seat, when said back is swung down into bed forming position, as shown in Figure 2, and which are withdrawn when the back is raised into seat back forming position.

Cords 25 are arranged to be connected to the outer end of the foot-rest frame 21 and to a portion of the top 26, of the automobile, or other convenient point on the front of the automobile, to support the said frame in horizontal elevated position.

From the above it will be seen that, in normal position the front seat back rests on the floor of the automobile, in vertical position to form the back of the seat, while the seat cushion frame 11 rests in proper seat forming position on the box 10, and the foot-rest hangs down in front of the box 10. Thus the parts assume a position permitting the use of the seats in the ordinary manner.

When it is desired to form a bed, the back of the front seat is lifted until its lower end is above the top of the box 10, and then swung backwardly and downwardly, on the trunnions 15', until it rests on the supporting rods 24, which have been pulled out from the rear seat box 23. This rearward and downward swinging movement of the seat back lifts the pivotal ends of the arms 19 into the plane of the seat back, and causes said arms, together with the seat cushion, to slide forwardly a short distance. The foot-rest is then lifted into horizontal position and the suspending cords properly secured to hold the foot-rest in position. There is thus provided a bed which includes the seat and back of the front seat, and the seat portion of the back seat of the automobile, the bed being as wide as the automobile. Such a bed will accommodate two or three persons.

What is claimed is:

The combination with the side walls and seats of an automobile, of apertured brackets mounted on the sides of the automobile, longitudinally grooved plates carried by the sides of the back of the front seat of the automobile, longitudinally ribbed plates having trunnions pivotally supported in the apertured brackets and slidably receiving the said grooved plates thereon, a foot-rest movably carried by the seat member of the front seat, pivotal connections between the said seat member and the ribbed plates, and slidable members carried by the rear seat of the automobile for supporting the said front seat back in a horizontal position.

In testimony whereof, I affix my signature in the presence of two witnesses.

Dr. CLAUDE G. EATON.

Witnesses:
LILLIAN AURAND,
FANNIE TEITELBAUM.